(12) United States Patent
Suzuki (10) Patent No.: US 7,840,127 B2
(45) Date of Patent: Nov. 23, 2010

(54) IMAGING DEVICE WITH T-SHAPED SHAKE COMPENSATION ACTUATOR ARRANGEMENT

(75) Inventor: Yusuke Suzuki, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 335 days.

(21) Appl. No.: 11/862,956

(22) Filed: Sep. 27, 2007

(65) Prior Publication Data
US 2008/0080052 A1    Apr. 3, 2008

(30) Foreign Application Priority Data
Sep. 29, 2006   (JP) .................. P2006-268719

(51) Int. Cl.
*G03B 17/00* (2006.01)
(52) U.S. Cl. .................. 396/55; 348/208.11
(58) Field of Classification Search .......... 396/55; 348/208.11
See application file for complete search history.

(56) References Cited

U.S. PATENT DOCUMENTS

| | | | |
|---|---|---|---|
| 5,619,293 A | 4/1997 | Usui | |
| 5,745,800 A | 4/1998 | Kanbara et al. | |
| 5,835,799 A | 11/1998 | Washisu | |
| 5,943,512 A * | 8/1999 | Hamada et al. | 396/55 |
| 6,005,723 A * | 12/1999 | Kosaka et al. | 359/822 |
| 6,011,927 A | 1/2000 | Kamata | |
| 6,046,768 A | 4/2000 | Kaneda et al. | |
| 6,909,560 B2 * | 6/2005 | Lin et al. | 359/813 |
| 7,132,824 B2 | 11/2006 | Masuda et al. | |
| 7,268,336 B2 * | 9/2007 | Hsieh et al. | 250/208.1 |
| 2003/0067544 A1 | 4/2003 | Wada | |
| 2005/0128308 A1 | 6/2005 | Tholl et al. | |
| 2005/0259156 A1 | 11/2005 | Kosaka et al. | |
| 2005/0276588 A1 * | 12/2005 | Tsutsumi | 396/55 |

(Continued)

FOREIGN PATENT DOCUMENTS

JP   10-039350 A   2/1998

(Continued)

OTHER PUBLICATIONS

Korean Notice of Submission of Argument dated Oct. 30, 2008.

(Continued)

*Primary Examiner*—Melissa J Koval
*Assistant Examiner*—Leon W. Rhodes
(74) *Attorney, Agent, or Firm*—Birch, Stewart, Kolasch & Birch, LLP (57) ABSTRACT

An imaging device makes camera shake compensation by relatively moving an imaging optical system and an imaging element in directions perpendicular to an optical axis direction. The imaging device includes a first actuator that relatively moves the imaging optical system and the imaging element in a first direction perpendicular to the optical axis direction; a second actuator that relatively moves the imaging optical system and the imaging element in a second direction which is perpendicular to the optical axis direction and which intersects the first direction; and a first moving member to which the second actuator is attached, the first moving member that is moved together with the second actuator in the first direction by an action of the first actuator. The first actuator and the second actuator 6 are disposed to form a T shape.

8 Claims, 5 Drawing Sheets

EMBODIMENT

U.S. PATENT DOCUMENTS

| | | |
|---|---|---|
| 2006/0007320 A1 | 1/2006 | Seo |
| 2006/0056829 A1* | 3/2006 | Hirota et al. ............... 396/54 |
| 2006/0077260 A1 | 4/2006 | Pyo et al. |
| 2006/0082658 A1 | 4/2006 | Lee et al. |
| 2006/0279638 A1 | 12/2006 | Matsuda et al. |
| 2007/0279497 A1 | 12/2007 | Wada et al. |
| 2008/0079813 A1 | 4/2008 | Suzuki |
| 2008/0080052 A1 | 4/2008 | Suzuki |

FOREIGN PATENT DOCUMENTS

| | | |
|---|---|---|
| JP | 2001-194696 A | 7/2001 |
| JP | 2005-309209 A | 11/2005 |
| JP | 2005-331399 A | 12/2005 |
| KR | 1999-013837 U | 4/1999 |
| KR | 10-2006-0034356 A | 4/2006 |

OTHER PUBLICATIONS

U.S. Office Action from co-pending case U.S. Appl. No. 11/862,952 dated Mar. 22, 2010.

U.S. Office Action from co-pending case U.S. Appl. No. 11/862,952 dated Sep. 30, 2009.

* cited by examiner

FIG. 5A EMBODIMENT

FIG. 5B COMPARATIVE EXAMPLE

IMAGING DEVICE WITH T-SHAPED SHAKE
COMPENSATION ACTUATOR
ARRANGEMENT

CROSS-REFERENCE TO RELATED APPLICATIONS

This application is based upon and claims the benefit of priority from the Japanese Patent Application No. 2006-268719 filed on Sep. 29, 2006, the entire contents of which are incorporated herein by reference.

BACKGROUND OF THE INVENTION

1. Technical Field

The invention relates to an imaging device used in shooting.

2. Description of the Related Art

JP 2005-309209 A discloses an imaging device having a function of compensating camera shake during shooting, for use in a camera, a video camera and a camera installed in a cellular phone. In this imaging device, a moving member is movably attached to a base member through an actuator, and the moving member is formed to have an L shape. Thereby, this imaging device is intended to realize a size reduction in comparison with the case where the moving member is formed annularly to surround the whole periphery of the imaging element.

[Patent Document 1] JP 2005-309209 A

[Patent Document 2] JP 2005-331399 A (corresponding to U.S. Pat. No. 7,132,824)

However, even in such an imaging device, the moving member needs a size to surround a half of the periphery of the imaging element. For this reason, it is difficult to reduce sufficiently the imaging device in size. In particular, in the imaging device installed into the cellular phone, it is desired that a size is reduced as small as possible.

SUMMARY OF THE INVENTION

The invention has been made in view of the above circumstances and provides an imaging device capable of realizing a size reduction by configuring a camera-shake compensation mechanism to be small in size.

According to an aspect of the invention, an imaging device for making camera shake compensation by relatively moving an imaging optical system and an imaging element in directions perpendicular to an optical axis direction, includes a first actuator, a second actuator and a first moving member. The first actuator relatively moves the imaging optical system and the imaging element in a first direction perpendicular to the optical axis direction. The second actuator relatively moves the imaging optical system and the imaging element in a second direction which is perpendicular to the optical axis direction and which intersects the first direction. The second actuator is attached to the first moving member. The first moving member is moved together with the second actuator in the first direction by an action of the first actuator. The first actuator and the second actuator are disposed to form a T shape.

With this configuration, the first actuator and the second actuator are disposed to form the T shape. Thereby, driving portions of the first actuator and the second actuator can be disposed closely, and the first moving member can be configured to be small in size. As a result, a size reduction of the imaging device can be achieved.

Also, in the imaging device, the first moving member may be disposed on a side of the imaging optical system.

In this case, the first moving member is disposed on the side of the imaging optical system. Thereby, the first moving member and the imaging optical system can be disposed side by side on the almost same plane. As a result, since the first moving member is not disposed on the optical axis side of the imaging optical system, the imaging device can be configured to be thin in the optical axis direction.

Also, the imaging device may further include a first supporting shaft and a second supporting shaft. The first supporting shaft is directed in parallel with the first direction and disposed on a first-actuator side of the imaging optical system. The first supporting shaft supports the first moving member so that the first moving member is movable in the first direction. The second supporting shaft is directed in parallel with the second direction and disposed on a second-actuator side of the imaging optical system. The second supporting shaft supports the imaging optical system so that the imaging optical system is movable in the second direction.

In this case, the first moving member is supported by the first supporting shaft so as to be movable in the first direction, and the imaging optical system is supported by the second supporting shaft so as to be movable in the second direction. Thereby, even if the imaging device gets a shock, it can be suppressed that an engaging portion between the first actuator and the second actuator is deformed. As a result, a shock resistance can be improved and a stable operation can be maintained.

Also, the first supporting shaft is disposed on the first-actuator side of the imaging optical system, and the second supporting shaft is disposed on the second-actuator side of the imaging optical system. Thereby, a moving mechanism and a supporting mechanism implemented by the first actuator and the second actuator can be made compact collectively. As a result, even though the first supporting shaft and the second supporting shaft are arranged, the imaging device can be configured to be compact.

In addition, in the imaging device, each of the first actuator and the second actuator may reciprocally move a shaft member by an action of a piezoelectric element.

According to the above configurations, the camera-shake compensation mechanism can be configured to be small in size, and a size reduction of the imaging device can be realized.

DETAILED DESCRIPTION OF EMBODIMENTS OF THE INVENTION

An embodiment of the invention will be described below with reference to the accompanying drawings. Like reference symbols will be affixed to like elements in the description of the drawings, and their redundant explanation will be omitted.

Figure 1:
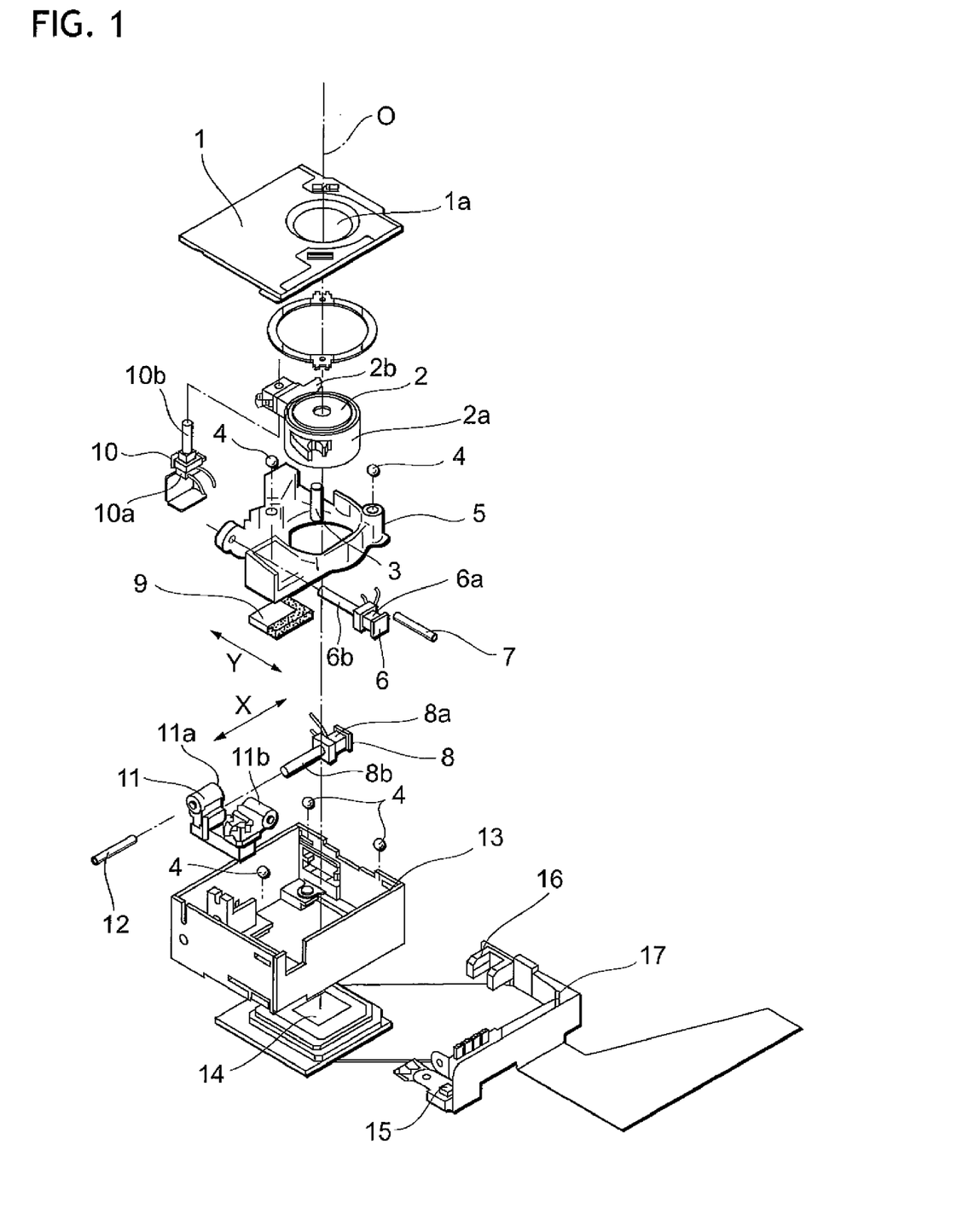
FIG. 1 is an exploded perspective view showing an imaging portion and a camera-shake compensation mechanism of an imaging device according to an embodiment of the invention.
Figure 2:
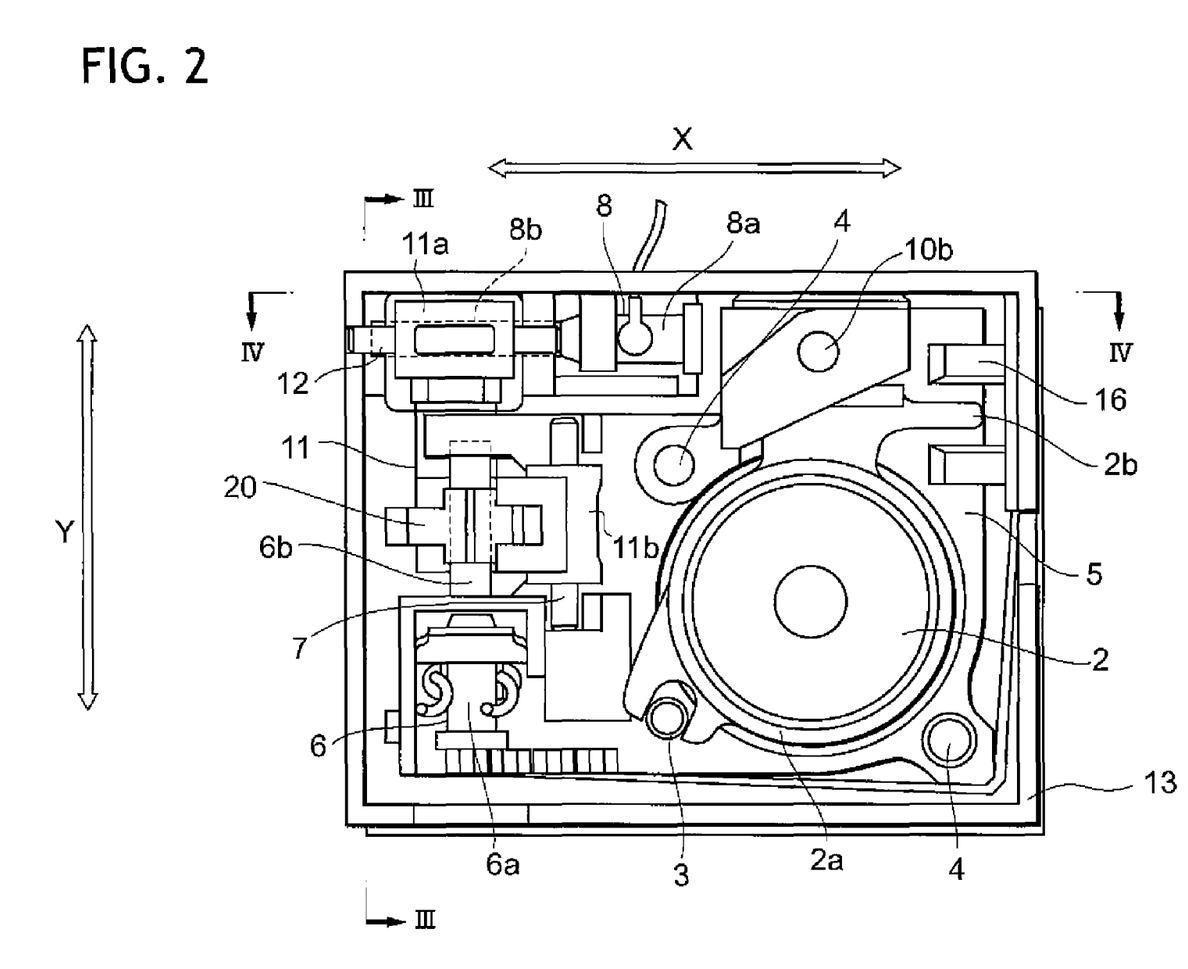
FIG. 2 is a plan view of the imaging portion and the camera-shake compensation mechanism of the imaging device in FIG. 1.
Figure 3:
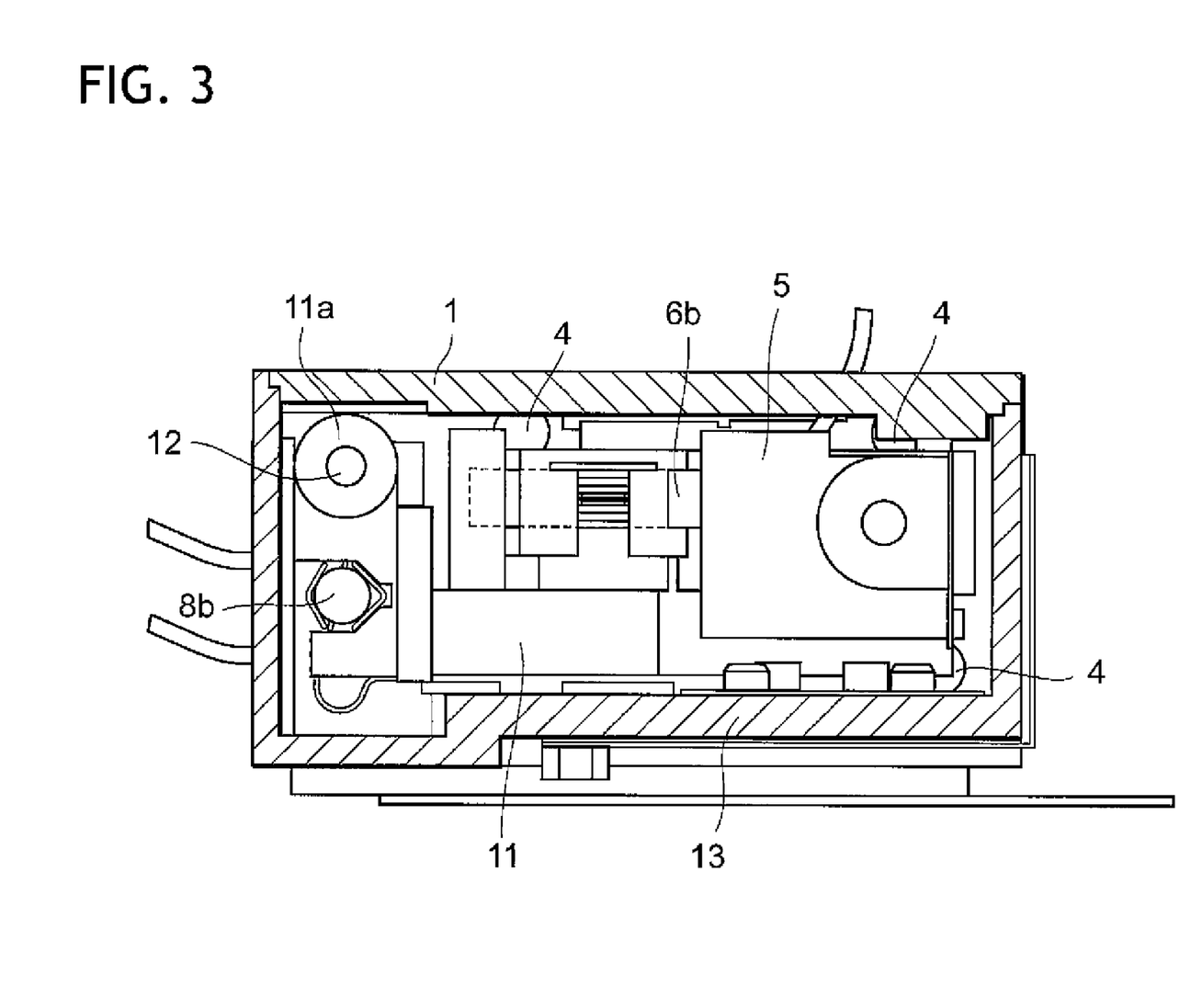
FIG. 3 is a section view taken along III-III in FIG. 2.
Figure 4:
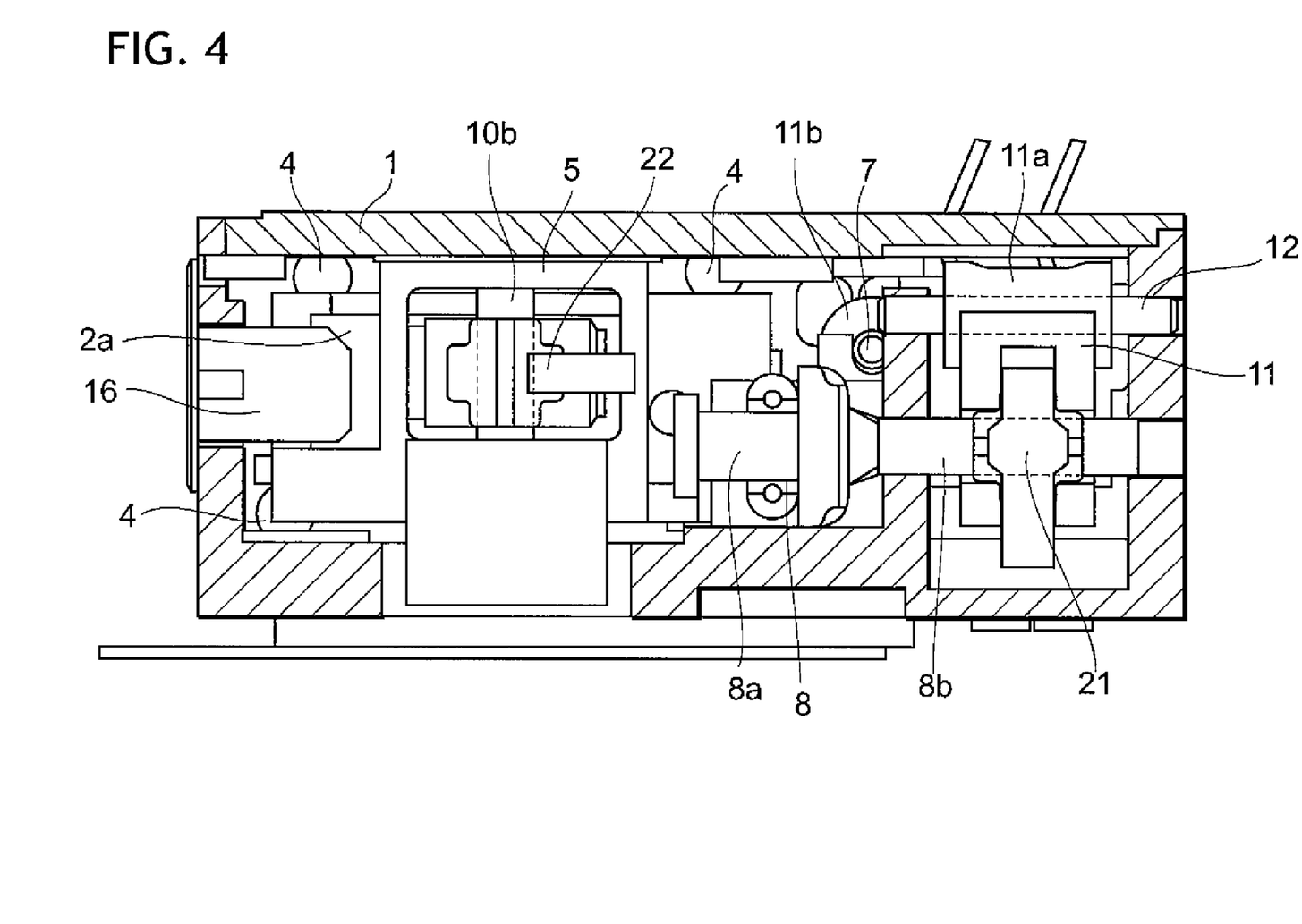
FIG. 4 is a section view taken along IV-IV in FIG. 2.

FIG. 1 is an exploded perspective view showing an imaging portion and a camera-shake compensation mechanism of an imaging device according to an embodiment of the invention. FIG. 2 is a plan view of the imaging portion and the camera-shake compensation mechanism of the imaging device in FIG. 1. FIG. 3 is a section view taken along III-III in FIG. 2. FIG. 4 is a section view taken along IV-IV in FIG. 2.

The imaging device according to this embodiment makes camera shake compensation by relatively moving an imaging optical system and an imaging element in directions perpendicular to an optical axis direction. In other words, the camera shake is compensated by moving the imaging optical system in response to the camera shake to change a relative position of the imaging optical system with respect to the imaging element. This imaging device is applied to an imaging portion installed into a camera, a video camera, a cellular phone and the like.

First, a configuration of the imaging device will be described below. As shown in FIG. 1, the imaging device according to this embodiment includes an imaging optical system 2 and an imaging element 14 for obtaining an image of a subject. The imaging optical system 2 is an optical system that converges light to the imaging element 14, and has an imaging lens. This imaging optical system 2 is configured by fitting a lens (not shown) in a holder 2a, for example. The imaging optical system 2 may be formed of a single lens or may be formed of a lens group including a plurality of lenses.

The imaging optical system 2 is attached to a second moving member 5. The imaging optical system 2 is provided to be relatively movable with respect to the imaging element 14 in a direction perpendicular to a direction of an optical axis O (optical axis direction). The second moving member 5 is housed in an imaging element holder 13, which fixes the imaging element 14. Since the second moving member 5 is supported by spherical bodies 4, the moving member 5 is movable relatively to the imaging element holder 13 and the imaging element 14 in the directions perpendicular to the optical axis direction. Therefore, when the imaging optical system 2 is moved together with the second moving member 5, the imaging optical system 2 is also moved relatively to the imaging element 14 in the directions perpendicular to the optical axis direction.

At that time, preferably the imaging optical system 2 is attached to the second moving member 5 so as to be movable in the optical axis direction. For example, a supporting shaft 3 directed in the optical axis direction is attached to the second moving member 5 and the imaging optical system 2 is attached so as to be movable along the supporting shaft 3. As an actuator 10 for moving the imaging optical system 2 in the optical axis direction, an actuator having a driving shaft 10b that reciprocally moves together with expansion and contraction of a piezoelectric element 10a is used. This actuator 10 acts as a third actuator that moves the imaging optical system 2 in the optical axis direction. The piezoelectric element 10a is attached to the second moving member 5, and the driving shaft 10b frictionally engages with the imaging optical system 2 via a frictionally engaging portion 22 (see FIG. 4). One end of the driving shaft 10b abuts against the piezoelectric element 10a and is adhered thereto with an adhesive, for example. The driving shaft 10b is a longitudinal member, and a cylindrical one is used, for example.

As a frictionally engaging structure, for example, the following structure may be employed. That is, a plate spring brings the driving shaft 10b into a state where the driving shaft 10b is in pressure-contact with the holder 2a of the imaging optical system 2 under a constant pressing force, and when the driving axis 10b moves, a constant fictional force is caused. When the driving shaft 10b is moved with exceeding this frictional force, a position of the imaging optical system 2 is maintained as it is by the inertia. In contrast, when the driving shaft 10b is moved in the opposite direction without exceeding this frictional force, the imaging optical system 2 is also moved in that opposite direction. The imaging optical system 2 can be moved relatively to the second moving member 5 by repeating such reciprocal movement of the driving shaft 10b. An electric signal for differentiating an expansion rate and a contraction rate is input into the piezoelectric element 10a from a control section (not shown) Thereby, the driving shaft 10b moves reciprocally at different rates, so that movement control of the imaging optical system 2 can be carried out.

In this manner, by attaching the imaging optical system 2 to the second moving member 5 so as to be movable in the optical axis direction, only the imaging optical system 2 can be moved in the optical axis direction relatively to the second moving member 5 to perform zooming or focusing. Therefore, it is not necessary that a zooming or a focusing is performed by moving the overall camera-shake compensation mechanism. As a result, components that are moved in zooming or focusing become small in size. Thus, the camera-shake compensation mechanism can be configured to be small in size.

The imaging element 14 is an imaging means that converts an image formed by the imaging optical system 2 into an electric signal, and is fixedly attached to the imaging element holder 13. As the imaging element 14, for example, a CCD sensor is employed.

The imaging device according to this embodiment includes a first actuator 8, a second actuator 6, and a first moving member 11. The first actuator 8 is an actuator that relatively moves the imaging optical system 2 and the imaging element 14 in a first direction (pitch direction) X perpendicular to the optical axis direction. As this first actuator 8, for example, an actuator having a driving shaft 8b that reciprocally moves together with expansion and contraction of a piezoelectric element 8a is used. The driving shaft 8b is disposed to be directed to the first direction X. The piezoelectric element 8a is attached to the imaging element holder 13 to which the imaging element 14 is fixed. The driving shaft 8b frictionally engages with the first moving member 11 via a frictionally engaging portion 21 (see FIG. 4). One end of the driving shaft 8b abuts against the piezoelectric element 8a and is adhered thereto with an adhesive, for example. The driving shaft 8b is a longitudinal member, and a cylindrical one is used, for example.

As a frictionally engaging structure, for example, the following structure may be employed. That is, a plate spring brings the driving shaft 8b into a state where the driving shaft 8b is in pressure-contact with the first moving member 11 under a constant pressing force, and when the driving axis 8b moves, a constant fictional force is caused. When the driving shaft 8b is moved with exceeding this frictional force, a position of the first moving member 11 is maintained as it is by the inertia. In contrast, when the driving shaft 8b is moved in the opposite direction without exceeding this frictional force, the first moving member 11 is also moved in that opposite direction. By repeating such reciprocal movement of the driving shaft 8b, the first moving member 11 can be moved in the first direction X with respect to the imaging element 14 and the imaging optical system 2 can be moved in the first direction relatively to the imaging element 14. An electric signal for differentiating an expansion rate and a contraction rate is input into the piezoelectric element 8a from the control section (not shown). Thereby, the driving shaft 8b moves reciprocally at different rates, so that movement control of the imaging optical system 2 can be carried out.

In some cases, the first actuator 8 may be configured by attaching the piezoelectric element 8a on the first-moving-member side and frictionally engaging the driving shaft 8b with the imaging element holder 13.

The second actuator 6 is an actuator that relatively moves the imaging optical system 2 and the imaging element 14 in a second direction (yaw direction) Y perpendicular to the optical axis direction. This second direction Y is perpendicular to the optical axis direction and intersects the first direction X. For example, the second direction Y is set to a direction perpendicular to the first direction X. As this second actuator 6, for example, an actuator having a driving shaft 6b that reciprocally moves together with expansion and contraction of a piezoelectric element 6a is used. The driving shaft 6b is disposed to be directed to the second direction Y. The piezoelectric element 6a is attached to the second moving member 5. The driving shaft 6b frictionally engages with the first moving member 11 via a frictionally engaging portion 20 (see FIG. 2). One end of the driving shaft 6b abuts against the piezoelectric element 6a and is adhered thereto with an adhesive, for example. The driving shaft 6b is a longitudinal member, and a cylindrical one is used, for example.

As a frictionally engaging structure, for example, the following structure may be employed. That is, a plate spring brings the driving shaft 6b into a state where the driving shaft 6b is in pressure-contact with the first moving member 11 under a constant pressing force, and when the driving axis 6b moves, a constant fictional force is caused. When the driving shaft 6b is moved with exceeding this frictional force, a position of the second moving member 5 is maintained as it is by the inertia. In contrast, when the driving shaft 6b is to be moved in one direction without exceeding this frictional force, the second moving member 5 is also moved in one direction while the driving shaft 6b stands still because of the frictional force. By repeating such reciprocal movement of the driving shaft 6b, the second moving member 5 can be moved in the second direction Y with respect to the imaging element 14 and the imaging optical system 2 can be moved in the second direction Y relatively to the imaging element 14. An electric signal for differentiating an expansion rate and a contraction rate is input into the piezoelectric element 6a from the control section (not shown). Thereby, the driving shaft 6b moves reciprocally at different rates, so that movement control of the imaging optical system 2 can be carried out.

The second actuator 6 is attached to the first moving member 11 via the frictional engagement. Therefore, when the first moving member 11 is moved in the first direction X by an action of the first actuator 8, the second actuator 6 is also moved in the first direction X.

In some cases, the second actuator 6 may be configured by attaching the piezoelectric element 6a on the first-moving-member side and frictionally engaging the driving shaft 6b with the second moving member 5.

A position sensing magnet 9 and a Hall element 15 are provided in the imaging device. The position sensing magnet 9 is a magnet attached to the second moving member 5. Any magnet may be used if such magnet can generate a magnetic field enough for the Hall element 15 to sense. The Hall element 15 is a magnetic sensor that senses relative positions of the imaging element 14 and the imaging optical system 2 with respect to the direction perpendicular to the optical axis direction, based on a status of the magnetic field generated from the position sensing magnet 9. The Hall element 15 is attached to a substrate 17, for example. The substrate 17 is a wiring board attached to the imaging element holder 13, and is bent like an t-shape, for example, in use. Lead wires of the piezoelectric elements 6a, 8a, 10a are attached to the substrate 17.

A photo interrupter 16 is provided in the imaging device. The photo interrupter 16 is a position sensor for sensing a position of the imaging optical system 2. The photo interrupter 16 is attached to the substrate 17 and disposed in a position in vicinity of the imaging optical system 2. The photo interrupter 16 has a light emitting portion and a light receiving portion. Through position sensing of a moving piece 2b that passes through a space between the light emitting portion and the light receiving portion, the photo interrupter 16 senses a position of the imaging optical system 2 in the optical axis direction. The moving piece 2b is a member that is formed in the holder 2a of the imaging optical system 2 and is moved together with the imaging optical system 2.

The imaging device has an upper cover 1. This upper cover 1 is a cover for covering an opening portion of the imaging element holder 13 into which the imaging portion and the camera-shake compensation mechanism are housed. The upper cover 1 has an opening portion 1a on which the image of the subject is incident.

As shown in FIG. 2, the first moving member 11 is supported by a first supporting shaft 12 so that this first moving member 11 is movable along the first direction X. The first supporting shaft 12 is a shaft member disposed along the first direction X, and is attached to the imaging element holder 13. This first supporting shaft 12 is provided to pass through a bearing portion 11a of the first moving member 11. Thereby, the first moving member 11 is supported by the first supporting shaft 12 so that the first moving member 11 is moved with respect to the imaging element 14 only in the first direction X.

The first supporting shaft 12 is disposed on the first-actuator side of the imaging optical system 2. In other words, the first supporting shaft 12 is not disposed on the opposite side to the first actuator 8 across the imaging optical system 2, but is disposed on the first-actuator side. As a result, a moving mechanism using the first actuator 8 and a supporting mechanism using the first supporting shaft 12 can be integrated and configured compactly.

The second moving member 5 is supported by a second supporting shaft 7 so that the second moving member 5 is movable along the second direction Y. The second supporting shaft 7 is a shaft member disposed along the second direction Y, and is attached to the second moving member 5. The second supporting shaft 7 is provided to pass through a bearing portion 11b of the first moving member 11. Therefore, the second moving member 5 is supported by the second supporting shaft 7 so that the second moving member 5 is moved with respect to the first moving member 11 only in the second direction Y.

The second supporting shaft 7 is disposed on the second-actuator side of the imaging optical system 2. In other words, the second supporting shaft 7 is not disposed on the opposite side to the second actuator 6 across the imaging optical system 2, but is disposed on the second actuator 6 side. As a result, a moving mechanism using the second actuator 6 and a supporting mechanism using the second supporting shaft 7 can be integrated and configured compactly.

The first actuator 8 and the second actuator 6 are disposed to form a T shape. In other words, the first actuator 8 and the second actuator 6 are disposed so that a front end portion of one member is directed to an intermediate portion of the other member to form the T shape. For example, the first actuator 8 and the second actuator 6 are combined so that a front end portion of the second actuator 6 is directed to an intermediate portion of the first actuator 8 to form the T shape.

Thereby, the driving shafts 8*b*, 6*b* of the first actuator 8 and the second actuator 6 can be disposed closely to each other. Therefore, the first moving member 11 that engages with both the driving shaft 8*b* and the driving shaft 6*b* can be configured to be small in size. As a result, a size reduction of the imaging device can be attained.

The term "T shape" contains not only the case where the first actuator 8 and the second actuator 6 are combined to form a perfect T shape, but also the case where the first actuator 8 and the second actuator 6 are combined to form a substantial T shape. For example, in the case where a front end portion of one of the first actuator 8 and the second actuator 6 is directed to an intermediate portion of the other, there may be a predetermined clearance between the intermediate portion and the front end portion or the front end portion may be directed to a position that gets out of a center of the intermediate portion. In the both events, the first moving member 11 that engages with both the first actuator 8 and the second actuator 6 can be configured to small in size, and thus a size reduction of the imaging device can be attained.

Next, a basic operation of the imaging device according to this embodiment will be described below.

In FIG. 1, when camera shake is caused during shooting with the imaging device, a camera-shake sensor (not shown) such as an inertia sensor senses the camera shake. Then, driving signals are output from the control section (not shown) to the first actuator 8 and the second actuator 6 to prevent an image captured by the imaging element 14 from being blurred.

The driving signals for differentiating an expansion rate and a contraction rate of the piezoelectric elements 8*a*, 6*a* are input into the first actuator 8 and the second actuator 6. Thus, the driving shafts 8*b*, 6*b* are reciprocally moved repeatedly. The first moving member 11 is moved with respect to the imaging element 14 in the first direction X by an action of the first actuator 8. The imaging optical system 2 and the second moving member 5 are moved with respect to the first moving member 11 in the second direction Y by an action of the second actuator 6. Therefore, the imaging optical system 2 is moved relatively to the imaging element 14.

As a result, even though the camera shake of the imaging device is caused, relative movements of the imaging optical system 2 and the imaging element 14 are controlled. Thus blurring of the image captured by the imaging element 14 can be suppressed.

As described above, according to the imaging device of this embodiment, the first actuator 8 and the second actuator 6 are disposed to form the T shape. Therefore, the driving portions of the first actuator 8 and the second actuator 6 can be disposed closely to each other and also, the first moving member 11 can be configured to be small in size. As a result, a size reduction of the imaging device can be achieved.

Figure 5A:
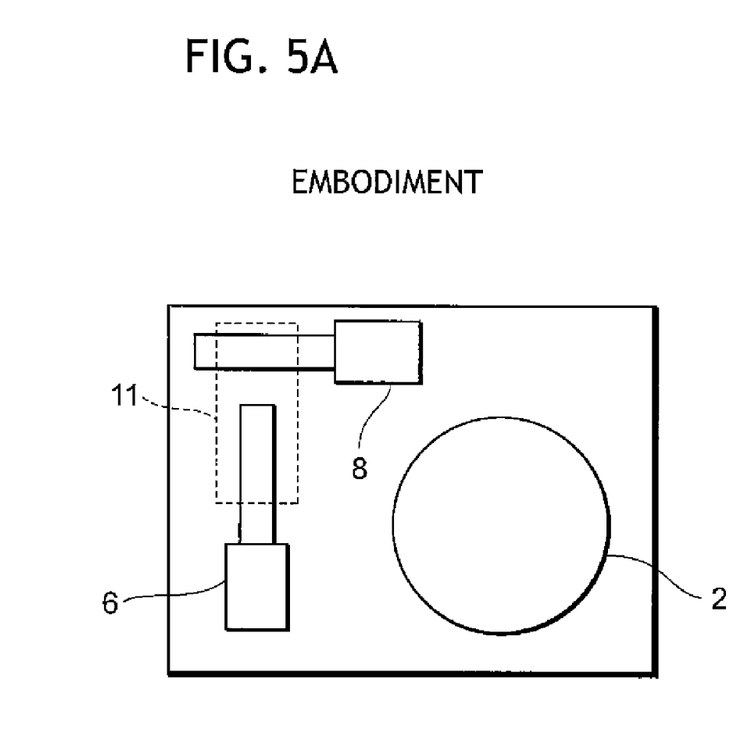
FIG. 5 is an explanatory view explaining a comparison between the imaging device in FIG. 1 and the comparative example.
Figure 5B:
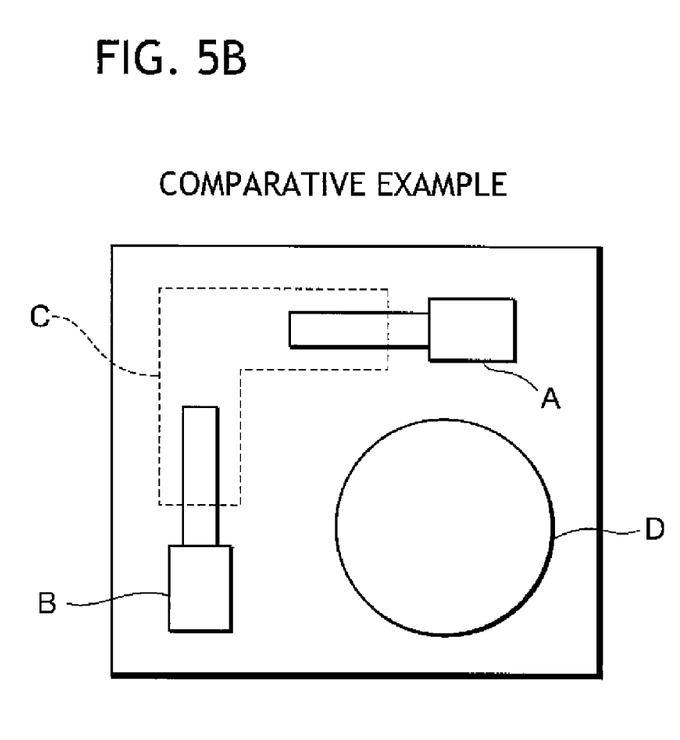

For example, as shown in FIG. 5B, in an imaging device of a comparative example, a first actuator A and a second actuator B are disposed to form an L shape around an imaging optical system D. In this case, since there is a distance between the first actuator A and the second actuator B to some extent, a moving member C that engages with the first actuator A and the second actuator B must be shaped in an L-shape and is configured to be large. Therefore, a size reduction of the imaging device cannot be sufficiently achieved.

On the contrary, as shown in FIG. 5A, in the imaging device according to this embodiment, the first actuator 8 and the second actuator 6 are disposed to form the T shape. Therefore, the driving portions of the first actuator 8 and the second actuator 6 can be disposed closely in contract to the case where these actuators are disposed to form the L shape as in the comparative example. As a result, the first moving member 11 can be configured to be small in size, and a size reduction of the imaging device can be achieved.

Also, according to the imaging device of this embodiment, the first moving member 11 is disposed on the side of the imaging optical system 2. Therefore, the first moving member 11 and the imaging optical system 2 can be disposed side by side on the almost same plane. As a result, the first moving member 11 is not disposed on the optical axis side of the imaging optical system 2. Thus, the imaging device can be configured to be thin in the optical axis direction.

Also, according to the imaging device of this embodiment, the first moving member 11 is supported by the first supporting shaft 12 so that the first moving member 11 is movable in the first direction X. The imaging optical system 2 is supported by the second supporting shaft 7 so that the imaging optical system 2 is movable in the second direction Y. Therefore, even when the imaging device gets a shock, it can be suppressed that the engaging portion between the first actuator 8 and the second actuator 6 is deformed. As a result, a shock resistance can be improved and a stable operation can be maintained.

Also, the first supporting shaft 12 is disposed on the first-actuator side of the imaging optical system 2, and the second supporting shaft 7 is disposed on the second-actuator side of the imaging optical system 2. Therefore, the moving mechanism and the supporting mechanism implemented by the first actuator 8 and the second actuator 6 can be integrated and configured compactly. As a result, even though the first supporting shaft 12 and the second supporting shaft 7 are disposed, the imaging device can be configured compactly.

Here, the foregoing embodiment shows an example of the imaging device according to the invention. The imaging device according to the invention is not limited to the imaging device illustrated in this embodiment. The imaging device according to the invention may be varied within a scope not to change the gist set forth in respective claims, or may be applied to other equipments.

For example, in this embodiment, the mechanism in which the imaging optical system 2 is moved with respect to the imaging element 14 in response to camera shake is explained as the camera-shake compensation mechanism. However, the imaging element 14 may be moved with respect to the imaging optical system 2. Even in such a case, the similar advantages to those of the imaging device according to the above embodiment can be attained. Also, in this embodiment, the actuator using the piezoelectric element is employed as the actuator of the imaging device. However, an actuator using another driving component such as a motor may be employed.

What is claimed is:

1. An imaging device for making camera shake compensation by relatively moving an imaging optical system and an imaging element in directions perpendicular to an optical axis direction, the imaging device comprising:
    a first actuator that moves the imaging optical system in a first direction perpendicular to the optical axis direction;
    a second actuator that moves the imaging optical system in a second direction which is perpendicular to the optical axis direction and which intersects the first direction; and
    a first moving member to which the second actuator is attached, the first moving member being moved together with the second actuator in the first direction by an action of the first actuator, wherein:

the first actuator and the second actuator are disposed such that a first end portion of the second actuator is directed to an intermediate portion of the first actuator so as to form a T shape.

2. The imaging device according to claim 1, wherein the first moving member is disposed on a side of the imaging optical system.

3. The imaging device according to claim 1, further comprising:

a first supporting shaft directed in parallel with the first direction and disposed on a first-actuator side of the imaging optical system, the first supporting shaft that supports the first moving member so that the first moving member is movable in the first direction; and a second supporting shaft directed in parallel with the second direction and disposed on a second-actuator side of the imaging optical system, the second supporting shaft that supports the imaging optical system so that the imaging optical system is movable in the second direction.

4. The imaging device according to claim 2, further comprising:

a first supporting shaft directed in parallel with the first direction and disposed on a first-actuator side of the imaging optical system, the first supporting shaft that supports the first moving member so that the first moving member is movable in the first direction; and a second supporting shaft directed in parallel with the second direction and disposed on a second-actuator side of the imaging optical system, the second supporting shaft that supports the imaging optical system so that the imaging optical system is movable in the second direction.

5. The imaging device according to claim 1, wherein each of the first actuator and the second actuator reciprocally moves a shaft member by an action of a piezoelectric element.

6. The imaging device according to claim 2, wherein each of the first actuator and the second actuator reciprocally moves a shaft member by an action of a piezoelectric element.

7. The imaging device according to claim 3, wherein each of the first actuator and the second actuator reciprocally moves a shaft member by an action of a piezoelectric element.

8. The imaging device according to claim 4, wherein each of the first actuator and the second actuator reciprocally moves a shaft member by an action of a piezoelectric element.

* * * * *